United States Patent [19]
Kim et al.

[11] Patent Number: 5,796,837
[45] Date of Patent: Aug. 18, 1998

[54] APPARATUS AND METHOD FOR GENERATING A SECURE SUBSTITUTION-BOX IMMUNE TO CRYPTANALYSES

[75] Inventors: Kwang Jo Kim; Sang Jin Lee; Sang Joon Park; Seung Cheol Goh; Dai Ki Lee, all of Taejon-shi, Rep. of Korea

[73] Assignee: Electronics and Telecommunications Research Institute, Taejon, Rep. of Korea

[21] Appl. No.: 780,143

[22] Filed: Dec. 26, 1996

[30] Foreign Application Priority Data

Dec. 26, 1995 [KR] Rep. of Korea ............ 95-56850

[51] Int. Cl.⁶ ............... H04L 9/06; H04L 9/28; H04L 9/00
[52] U.S. Cl. ............... 380/28; 380/1; 380/9; 380/29; 380/37; 380/43; 380/49
[58] Field of Search ............... 380/1, 2, 9, 28, 380/29, 37, 43, 49, 50

[56] References Cited

U.S. PATENT DOCUMENTS

| | | |
|---|---|---|
| 3,958,081 | 5/1976 | Ehrsam et al. ............ 380/29 |
| 3,962,539 | 6/1976 | Ehrsam et al. ............ 380/29 |
| 4,275,265 | 6/1981 | Davida et al. ............ 380/29 |
| 5,231,662 | 7/1993 | Van Rumpt et al. ............ 380/9 |
| 5,237,611 | 8/1993 | Rasmussen et al. . |
| 5,317,638 | 5/1994 | Kao et al. . |
| 5,473,693 | 12/1995 | Sprunk ............ 380/29 |
| 5,511,123 | 4/1996 | Adams ............ 380/29 |

*Primary Examiner*—Bernarr E. Gregory
*Attorney, Agent, or Firm*—Jacobson, Price, Holman & Stern, PLLC

[57] ABSTRACT

The apparatus for generating a secure substitution-box immune to differential and linear cryptanalysises comprises a preprocessor for exchanging a location by the unit of bit while passing the input of 64 bits data to be protected; a parity checker for obtaining 56 bits key information by passing the input of the 64 bits key by byte unit; a key expander for repetitive operation for generating 48 bits information upon receiving the key information; a first to sixteenth operating portion for performing the 16 times of operation for one data from the preprocessor while mixing the data with an expanding key information from the key expander; and a postprocessor for generating an output signal of 64 bits data upon receiving an operated result from the first to sixteenth operating portion.

20 Claims, 17 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 14 | 4 | 13 | 1 | 2 | 15 | 11 | 8 | 3 | 10 | 6 | 12 | 5 | 9 | 0 | 7 |
| 1 | 0 | 15 | 7 | 4 | 14 | 2 | 13 | 1 | 10 | 6 | 12 | 11 | 9 | 5 | 3 | 8 |
| 2 | 4 | 1 | 14 | 8 | 13 | 6 | 2 | 11 | 15 | 12 | 9 | 7 | 3 | 10 | 5 | 0 |
| 3 | 15 | 12 | 8 | 2 | 4 | 9 | 1 | 7 | 5 | 11 | 3 | 14 | 10 | 0 | 6 | 13 |

FIG. 14A

FIRST SUBSTITUTION-BOX

| 9 | 10 | 15 | 1 | 4 | 7 | 2 | 12 | 6 | 5 | 3 | 14 | 8 | 11 | 13 | 0 |
| 2 | 13 | 8 | 4 | 11 | 1 | 14 | 7 | 12 | 3 | 15 | 9 | 5 | 6 | 0 | 10 |
| 10 | 12 | 4 | 7 | 9 | 2 | 15 | 1 | 3 | 6 | 13 | 8 | 14 | 5 | 0 | 11 |
| 4 | 11 | 1 | 13 | 14 | 7 | 8 | 2 | 10 | 0 | 6 | 3 | 9 | 12 | 15 | 5 |

FIG. 14B

SECOND SUBSTITUTION-BOX

| 6 | 3 | 5 | 0 | 8 | 14 | 11 | 13 | 9 | 10 | 12 | 7 | 15 | 4 | 2 | 1 |
| 9 | 6 | 10 | 12 | 15 | 0 | 5 | 3 | 4 | 1 | 7 | 11 | 2 | 13 | 14 | 8 |
| 5 | 8 | 3 | 14 | 6 | 13 | 0 | 11 | 10 | 15 | 9 | 2 | 12 | 1 | 7 | 4 |
| 6 | 3 | 15 | 9 | 0 | 10 | 12 | 5 | 13 | 8 | 2 | 4 | 11 | 7 | 1 | 14 |

FIG. 14C

THIRD SUBSTITUTION-BOX

| 11 | 5 | 8 | 2 | 6 | 12 | 1 | 15 | 7 | 14 | 13 | 4 | 0 | 9 | 10 | 3 |
| 7 | 8 | 1 | 14 | 11 | 2 | 13 | 4 | 12 | 3 | 6 | 9 | 5 | 15 | 0 | 10 |
| 8 | 11 | 1 | 12 | 15 | 6 | 2 | 5 | 4 | 7 | 10 | 9 | 3 | 0 | 13 | 14 |
| 13 | 2 | 4 | 7 | 1 | 11 | 14 | 8 | 10 | 9 | 15 | 0 | 12 | 6 | 3 | 5 |

FIG. 14D

FOURTH SUBSTITUTION-BOX

| 13 | 11 | 8  | 14 | 3  | 0  | 6  | 5  | 4  | 7  | 2 | 9  | 15 | 12 | 1  | 10 |
| 10 | 0  | 3  | 5  | 15 | 6  | 12 | 9  | 1  | 13 | 4 | 14 | 8  | 11 | 2  | 7  |
| 6  | 5  | 11 | 8  | 0  | 14 | 13 | 3  | 9  | 12 | 7 | 2  | 10 | 1  | 4  | 15 |
| 9  | 12 | 5  | 15 | 6  | 3  | 0  | 10 | 7  | 11 | 2 | 8  | 13 | 4  | 14 | 1  |

FIG. 14E

FIFTH SUBSTITUTION-BOX

| 12 | 6  | 2  | 11 | 5 | 8  | 15 | 1  | 3  | 13 | 9 | 14 | 0  | 7  | 10 | 4  |
| 15 | 0  | 12 | 5  | 3 | 6  | 9  | 10 | 4  | 11 | 2 | 8  | 14 | 1  | 7  | 13 |
| 1  | 12 | 15 | 5  | 6 | 11 | 8  | 2  | 4  | 7  | 10| 9  | 13 | 0  | 3  | 14 |
| 6  | 3  | 10 | 0  | 9 | 12 | 5  | 15 | 13 | 4  | 1 | 14 | 7  | 11 | 8  | 2  |

FIG. 14F

SIXTH SUBSTITUTION-BOX

| 14 | 8  | 2  | 5  | 9  | 15 | 4  | 3  | 7  | 1 | 12 | 6  | 0  | 10 | 11 | 13 |
| 1  | 13 | 11 | 8  | 2  | 4  | 7  | 14 | 10 | 6 | 0  | 15 | 5  | 9  | 12 | 3  |
| 4  | 2  | 9  | 15 | 14 | 8  | 3  | 5  | 10 | 7 | 0  | 12 | 13 | 1  | 6  | 11 |
| 8  | 11 | 7  | 4  | 13 | 1  | 14 | 2  | 5  | 0 | 9  | 10 | 6  | 15 | 3  | 12 |

FIG. 14G

SEVENTH SUBSTITUTION-BOX

| 4  | 13 | 10 | 3  | 7  | 0  | 9  | 14 | 2 | 1  | 15 | 6  | 12 | 11 | 5  | 8  |
| 9  | 0  | 15 | 10 | 12 | 6  | 5  | 3  | 14| 7  | 1  | 13 | 11 | 8  | 2  | 4  |
| 13 | 10 | 3  | 9  | 0  | 7  | 14 | 4  | 8 | 6  | 5  | 12 | 11 | 1  | 2  | 15 |
| 10 | 3  | 12 | 6  | 5  | 9  | 0  | 15 | 4 | 8  | 11 | 1  | 14 | 7  | 13 | 2  |

FIG. 14H

EIGHTH SUBSTITUTION-BOX

| 1  | 10 | 2  | 12 | 15 | 9  | 4  | 7  | 14 | 3  | 5  | 0  | 8  | 6  | 11 | 13 |
| 14 | 13 | 7  | 11 | 2  | 4  | 1  | 8  | 0  | 10 | 9  | 6  | 5  | 15 | 12 | 3  |
| 10 | 15 | 12 | 1  | 9  | 2  | 7  | 4  | 13 | 0  | 6  | 11 | 3  | 5  | 8  | 14 |
| 4  | 8  | 1  | 2  | 7  | 11 | 13 | 14 | 10 | 5  | 15 | 12 | 0  | 6  | 3  | 9  |

1

APPARATUS AND METHOD FOR GENERATING A SECURE SUBSTITUTION-BOX IMMUNE TO CRYPTANALYSES

BACKGROUND OF THE INVENTION

1. Field of the Invention

This invention relates to an apparatus and method for generating a substitution-box which can be used in a DES (Data Encryption Standard), which is well known as a data security standard system all over the world, more particulary to an apparatus and method for generating a secure substitution-box immune to both differential cryptanalysis and linear cryptanalysis.

2. Description of the Prior Art

In connection with the DES being most widely used in practice at present, two cryptanalysis methods more effective than the security criterion ($2^{56}$) at the time of its design have been published in 1990. One of the two methods is a differential cryptanalysis proposed by Shamir and Biham in Israel, who insisted that it is possible to decrypt DES decryption by the $2^{47}$ times of operation. The second cryptanalysis method is a linear cryptanalysis, expanded by the concept of the differential cryptanalysis, proposed by Matsui in Japan, where he insisted that it is possible to decrypt DES by the $2^{43}$ of operation. A common point of these cryptanalysis methods is to search for a hidden key information by finding in advance differential and linear properities which give a clue to cryptanalysis of 8 substitution-boxes essential within the DES and then analysing by probability an useful repetition property.

SUMMARY OF THE INVENTION

It therefor is an object of the present invention to provide an apparatus and method for generating a substitution-box secure against differential and linear cryptanalyses of the DES more enforced than the degree $2^{56}$ of complexity of a key transfer check by presenting an respective secure judgement criterion against differential and linear cryptanalyses, generating 8 substitution-boxes created in reality, and improving the security of the current DES.

In order to accomplish the object, according to an aspect of this invention an apparatus for generating a secure substitution-box immune to differential and linear cryptanalyses comprises a preprocessor for exchanging a location by the unit of bit while passing the input of 64 bits data to be protected; a parity checker for obtaining 56 bits key information by passing the input of the 64 bits key by byte unit; a key expander for repetitive operation for generating 48 bits information upon receiving the key information; a first to sixteenth operating portion for performing the 16 times of operation for one data from the preprocessor while mixing the data with an expanding key information from the key expander; and a postprocessor for generating an output signal of 64 bits data upon receiving an operated result from the first to sixteenth operating portion.

According to another aspect of this invention, a method for generating a secure substitution-box, the method being applicable to an apparatus for generating the secure substitution-box immune to differential cryptanalysis, comprises a first step of checking whether the condition that $S(x)$ should not be equal to $S(x \oplus (11 \text{ efg0}))$ with respect to a value of any efg and all of 6 bits input for any substitution-box is satisfied or not; and a second step of, if it is determined that the condition is satisfied at the first step, selecting and outputting the satisfied substitution-box, if it is determined that the condition is not satisfied at the first step, selecting and outputting the non-satisfied substitution-box.

According to still another aspect of this invention, a method for generating a secure substitution-box, the method being applicable to an apparatus for generating the secure substitution-box immune to linear cryptanalysis, comprises determining whether the corresponding condition (D1) of the apparatus for generating the secure substitution-box immune to linear cryptanalysis and then outputting a satisfied substitution-box.

BRIEF DESCRIPTION OF THE DRAWINGS

The present invention will be more clearly understood from the description as set forth below, with reference to the accompanying drawings, wherein:

FIGS. 14A to 14H are exemplary views of 8 substitution-boxes generated, according to the present invention.

DETAILED DESCRIPTION OF THE PREFERRED EMBODIMENT

Hereinafter, the present invention will be described by way of example with reference to the accompanying drawings.

Figure 1:
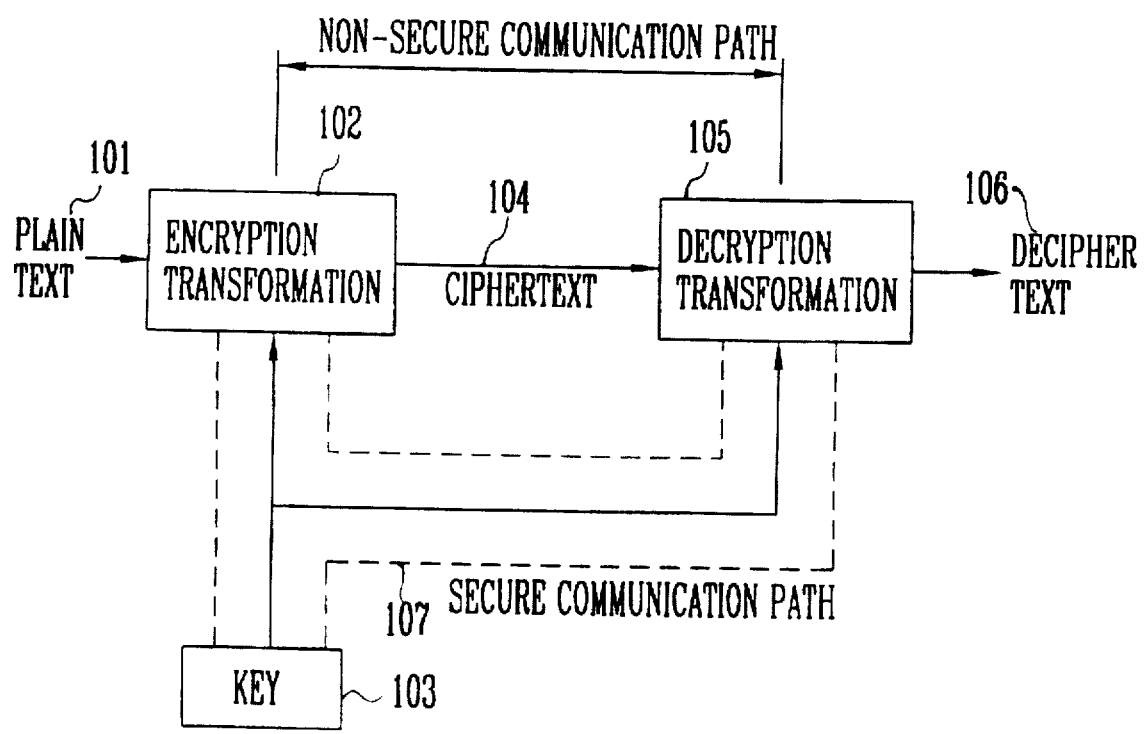
FIG. 1 is a schematic diagram of a general information security system to which this invention is applicable.

FIG. 1 shows a schematic diagram of a general information security system to which the present invention is applicable.

Referring to FIG. 1, when an important information stored in a computer is transmitted over a non-secure communication path, the information in the form of plain text 101 stored in the computer is subject to the transformation into encryption 102 for creating an encrypted text by use of a key 103 transmitted in advance over a secure communication path 107 between a transmitter and a receiver and then is transmitted to the other party desired for communication. At this time, though a third party rather than an authorized transceiver may intercept the encrypted text at his disposal, he can not restore an original information legitimately because he does not know the key information. On the contrary, the receiver who had the key information previously delivered to his own can perform the transformation into decryption 105 as an inverse transformation of the transformation into encryption to obtain a decrypted text identical with the original plain text.

Figure 2:
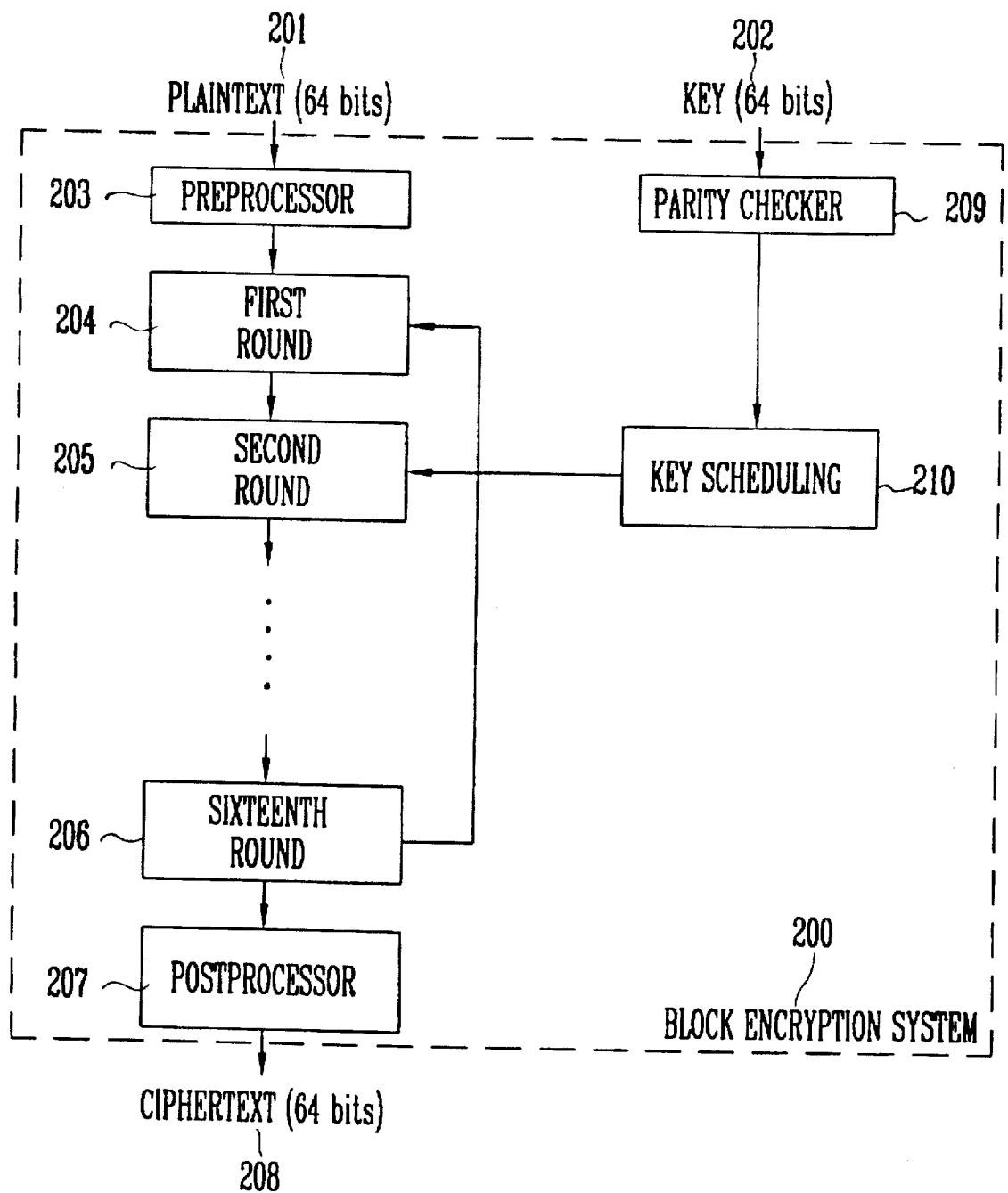
FIG. 2 is a schematic diagram of a block encryption system in the form of DES to which this invention is applicable.

FIG. 2 shows the known DES algorithm to which this invention is applicable. A description about the operation of the system is below.

An input of DES is a 64 bits data input 201 to be protected and a 64 bits key input information 202 delivered legitimately and an oupput of DES is a transformed encryted text 208.

The 64 bits data input 201 is exchanged in the location of the bits by bit unit while passing a preprocessor 203. The 64 bits key input 202 passes by byte unit through a parity checker 209 to obtain a substantial key information with 56 bits and then this obtained information provides 48 bits used every repetition operation via a key expander 210 for repetition operation which generates 48 bits information used in a repetitive operating portion.

The data preprocessed above is processed with mixed by being the 48-bit expanded key information 16 times through a first operating portion 204, a second operating portion 205, . . . , to a sixteenth operating portion 206. B2 operating portions divide 64 bits into two 32 bits halves. The 32 bits information in right-side of the two being 32 bits output through the repetition operating portion to be described below, and the 32 bits information in left-side of the two being subject to the operation of the exclusive or sum by bit unit and exchanging the information of 32 bit unit to again be the input of the next repetition operating portion. In a series of procedures, the transformation into the encryption is essentially equal to the transformation into the decryption but may use an expanded key information in a reverse order.

Figure 3:
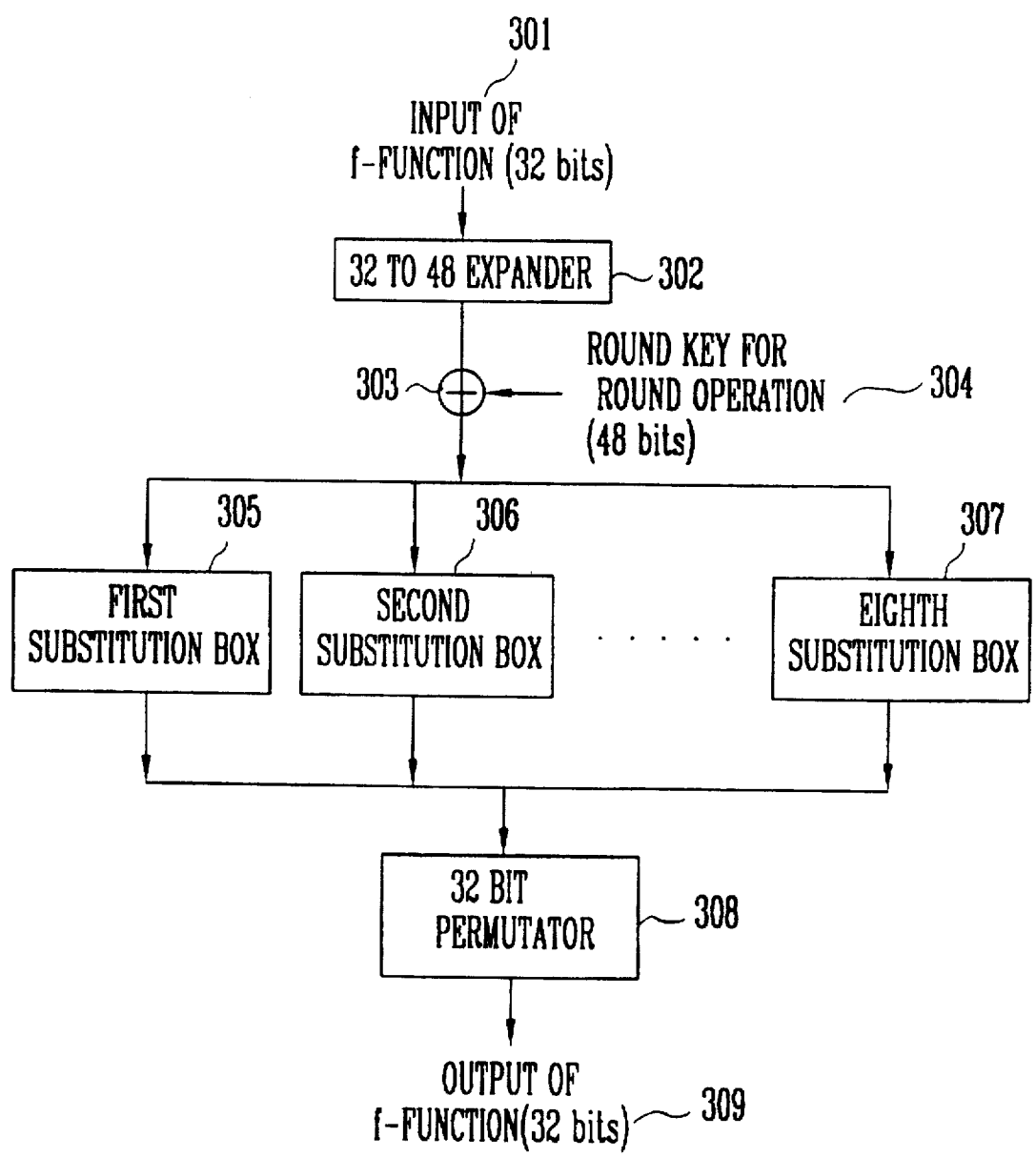
FIG. 3 is a schematic diagram of a repetition operating portion in DES to which this invention is applicable.

FIG. 3 shows a schematic diagram of the repetition operating portion used in the present invention.

Referring to FIG. 3, the 32 bits input 301 of the repetition operating portion is expanded to 48 bits by a 32 to 48 expander 302. In other words, if it is assumed that the 32 bits input is a1, a2, . . . , a32, after passing through the 32 to 48 expander 302 , these bits become a32 , a1, a2, . . . , a5, a6, a5, a6, a7, . . . , a31, a32 to be 48 bits.

The 48 bits information is subject to the operation of the Exclusive OR with the expanded key 304 with 48 bits for the repetition operation by bit unit and then the result is divided into eight by the unit of 6 bits. Thereafter, each 6 bits is inputted to a first substitution-box 305, a second substitution-box 306, . . . , an eighth substitution-box 307, respectively and then outputted as 4 bits unit from the respective substitution-boxes. These eight 4 bits units are combined each other to obtain 32 bits information and then pass through a location exchanger 308 by bit unit to obtain an output 309 of the 32 bits repetition operating portion.

Figures 4, 5:
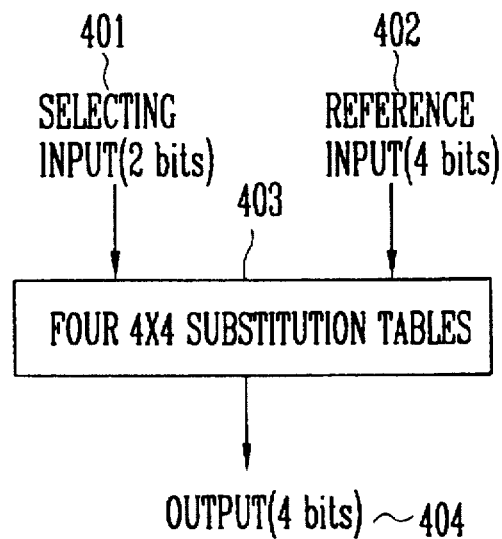
FIG. 4 is a schematic diagram of a substitution-box of the repetition operating portion in DES to which this invention is applicable.
FIG. 5 is an exemplary view of the substitution-box.

FIG. 4 shows a schematic diagram of a substitution-box to which the present invention is applicable.

Eight substitution-boxes have identical structure, each being formed of four substitution tables 403 with integer numbers from 0 to 15 as elements. In operation, bit b0 and b5 of 6 bits input, b0, b1, . . . , b5 are combined to select an input 401 among four substitution tables 403 and the middle 4 bits, i.e., b1, b2, b3, b4 of 6 bits input designates an address of one substitution table value of four substitution table, thereby outputting a stored value therein.

FIG. 5 illustrates one of the existing 8 6×4 substitution-boxes in DES.

If, for instance, an input is 100011 in binary number, bit b0 and b5 are combined to be 11 in binary number and 3 in decimal number. Accordingly, a third row 501 is selected. Then, because the middle 4 bits 0001 of the input is 1 in decimal number, the first value 502 of the third substitution table is read out to be outputted as 12 in decimal number, i.e., 1100 in binary number. When such a substitution-box is expressed in a mathemical symbol, it is S(x): $Z_2^6 A \to Z_2^4$ which plays the most inportant role in DES.

Figure 6:
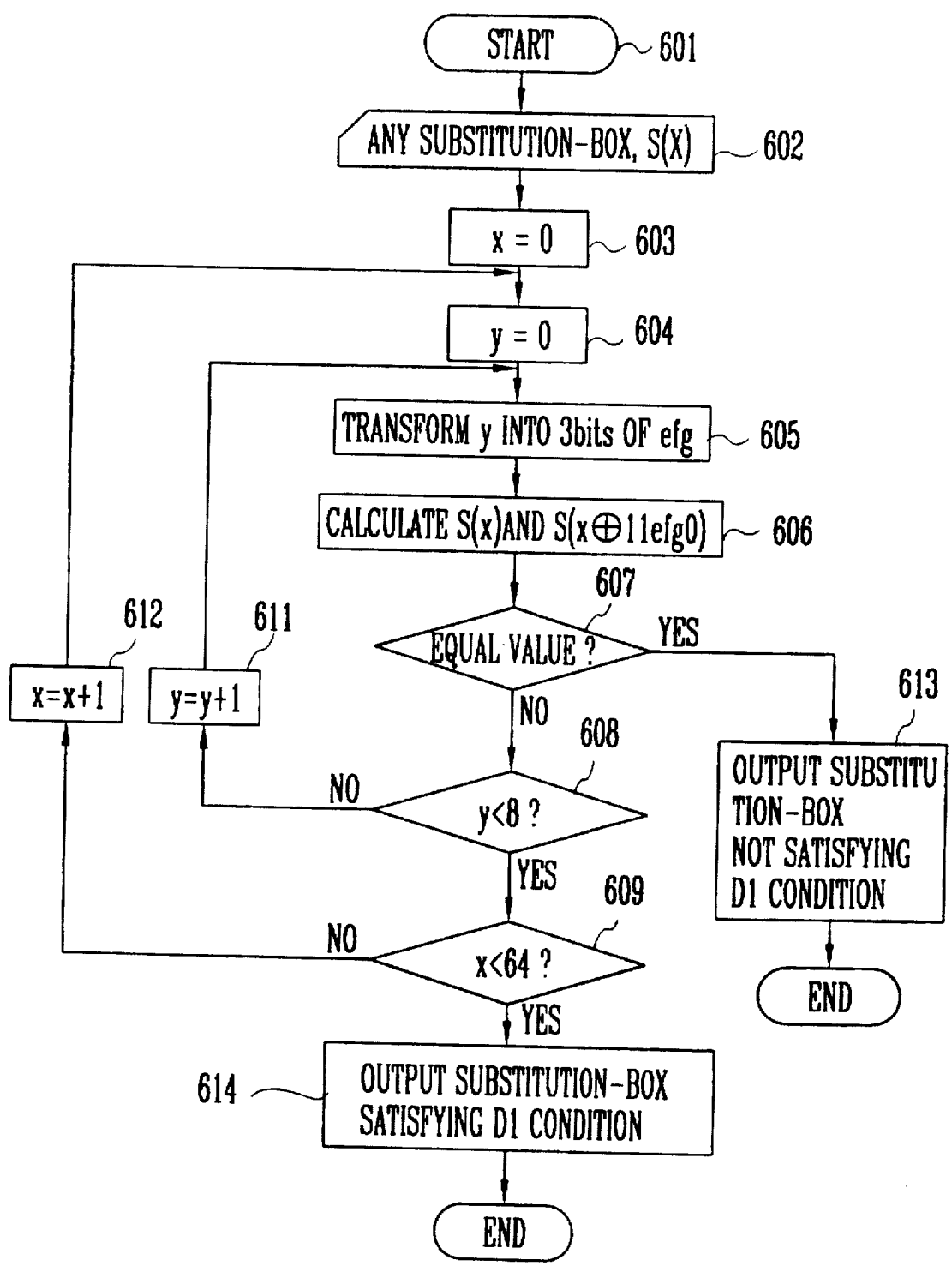
FIG. 6 is a flowchart for illustrating a D1 condition check.

FIG. 6 shows a flowchart for checking the condition D1 related the differential cryptanalysis.

In order to be secure against the differential cryptanalysis, a condition should be given such that the change of the input of all 8 substitution-boxes causes the change of their output. For all 6 bits input X (step 603) of any substitution-box (step 602) and any efg value (step 604), S(x) should be not equal to $S(x \oplus (11\ efg\ 0))$ (step 607) and a substitution-box for which this condition is satisfied are chosen (step 614).

Now, several terms are defined to constitute a secure substitution-box immune to the linear cryptanalysis. The first step of the linear cryptanalysis method is to compute a linear distribution table of the substitution-box. If 6 bits input and 4 bits output which are masked are indicated as $\alpha$ and $\beta$, respectively, a linear distribution table $NS(\alpha, \beta)$ is defined for any substitution-box $S(x)$ as follows:

$$NS(\alpha, \beta) = \#\{x \in Z_2^6 | x \cdot \alpha = S(x) \cdot \beta\} - 32$$

In addition, the greatest value in the linear distribution table is denoted by m.

Figure 7:
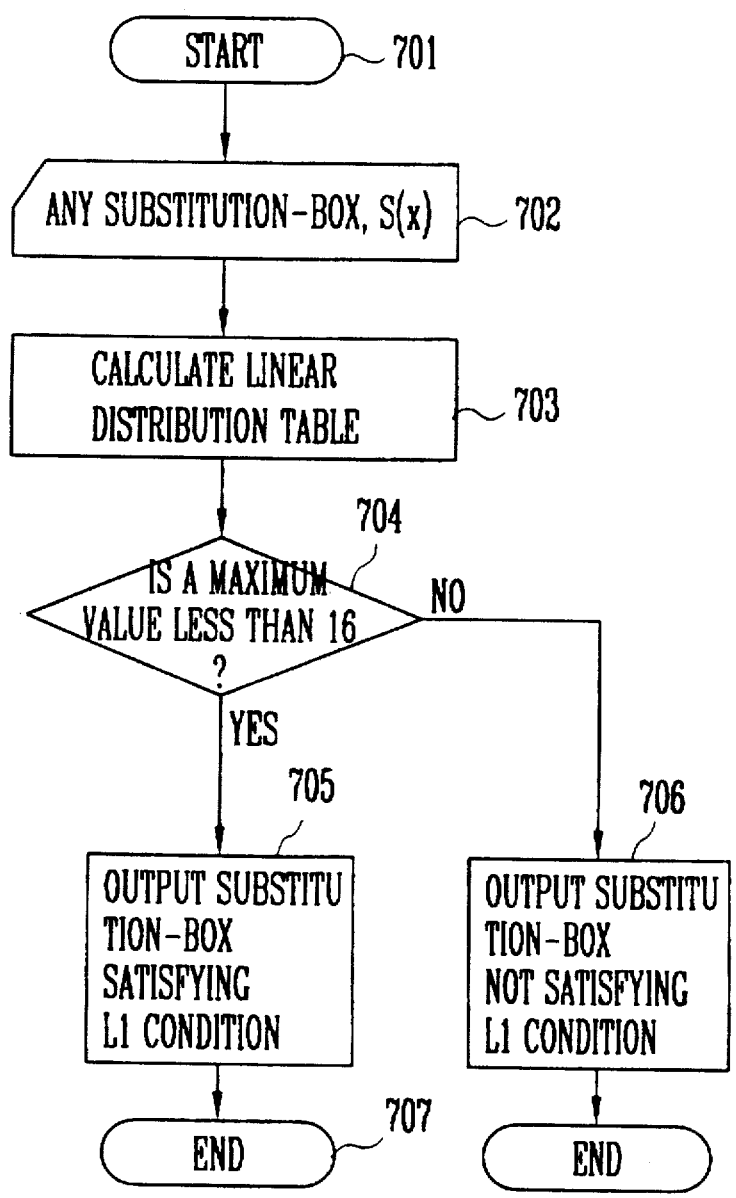
FIG. 7 is a flowchart for illustrating an L1 condition check.

FIG. 7 shows a flowchart for checking an L1 condition as one of the condition required to generate a secure substitution-box immune to the linear cryptanalysis. More specifically, any random 6×4 substitution-box is read out (step 702) and then its linear distribution table is calculated (step 703). Thereafter, if it is determined that m is less than 16, a 6×4 substitution-box for which L1 condition is satisfied is outputted (step 705), if it is determined that m exceeds the maximum value 16, a substitution-box for which the L1 condition is not satisfied is outputted (step 706).

Figure 8:
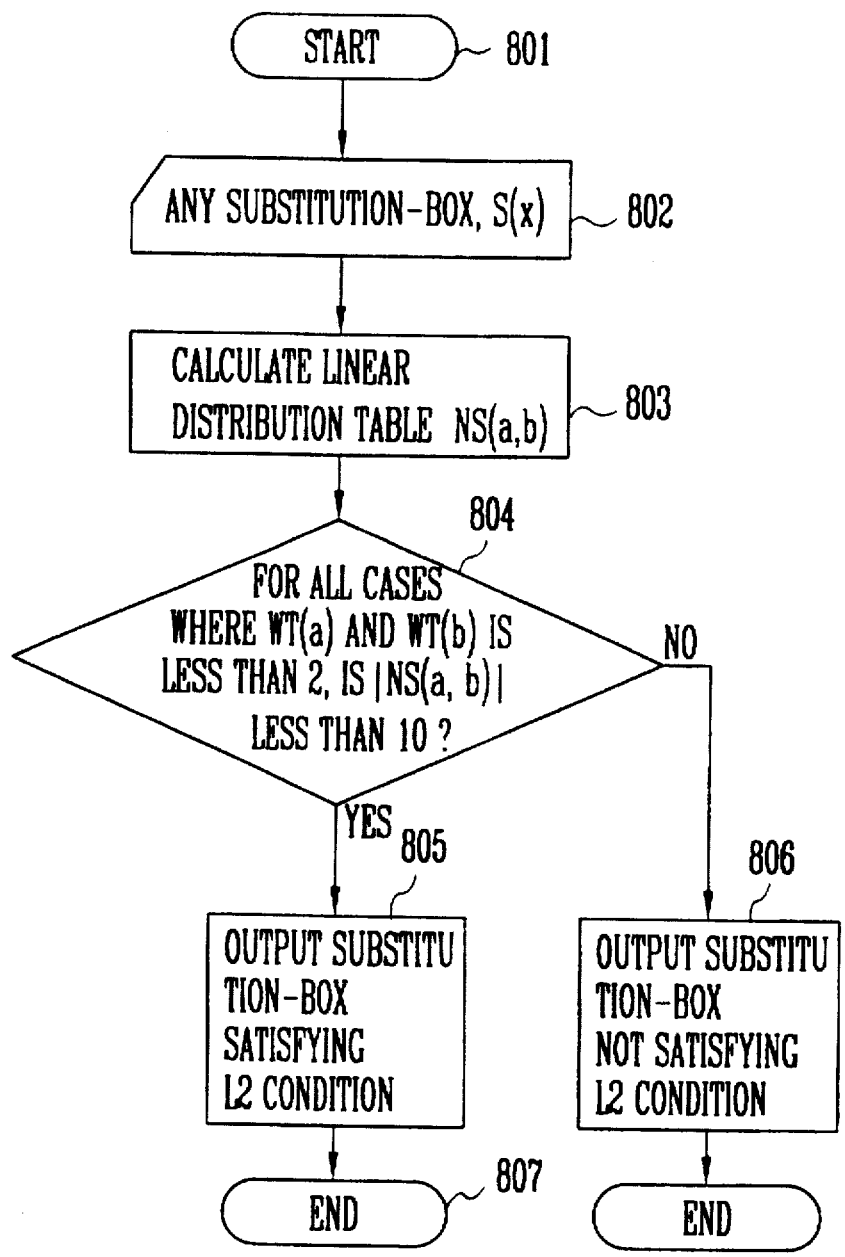
FIG. 8 is a flowchart for illustrating an L2 condition check.

FIG. 8 shows a flowchart for checking an L2 condition as one of the condition required to generate a secure substitution-box immune to the linear cryptanalysis. More specifically, for a and b with the count of 1 less than two on the linear distribution table (step 803) of any substitution-box (step 802), as a condition to minimize a linear repetition characteristics, if it is determined that an absolute value of the linear distribution table, |NS (a, b)|, is less than 10 (step 804), a substitution-box for which the L2 condition is satisfied is outputted (step 805).

Figure 9:
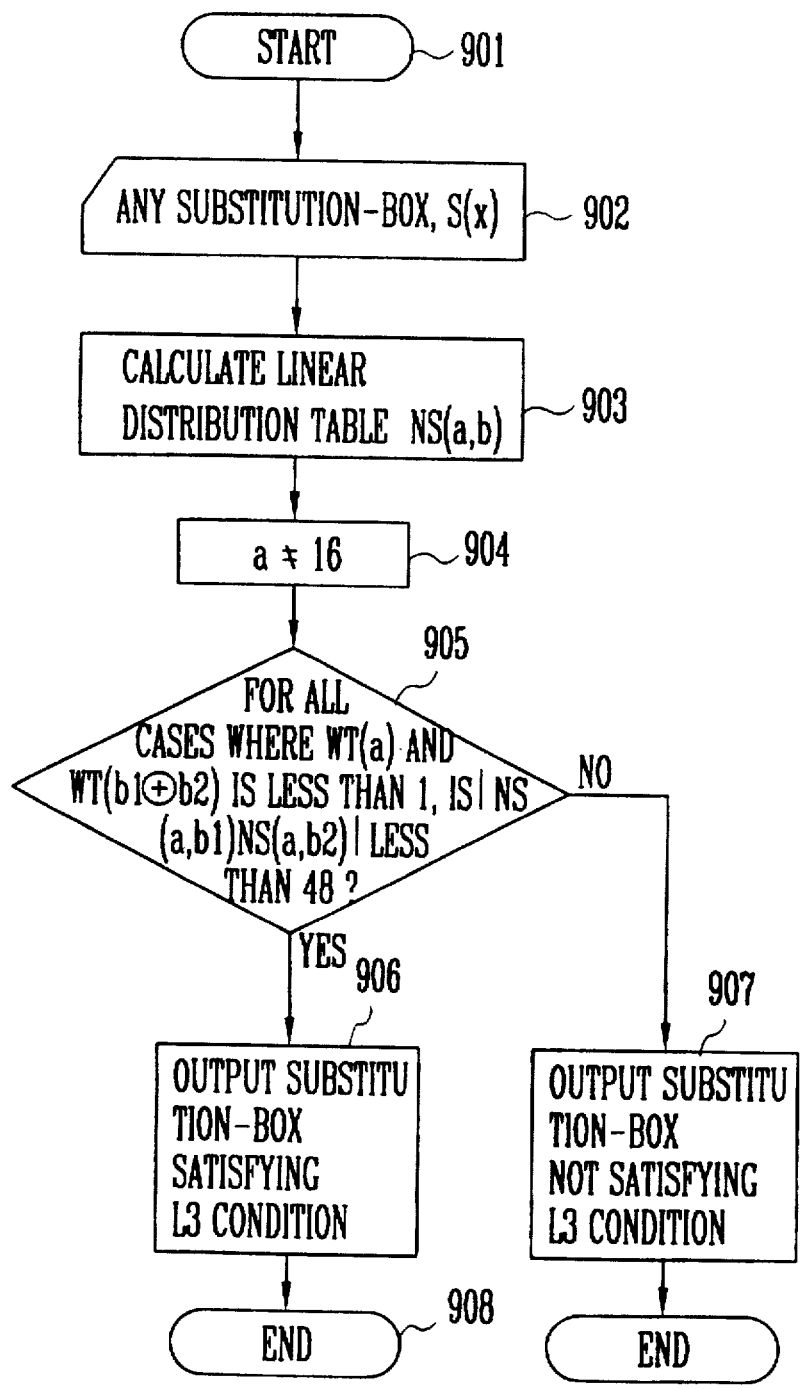
FIG. 9 is a flowchart for illustrating an L3 condition check.

FIG. 9 shows a flowchart for checking an L3 condition as one of the conditions required to generate a secure substitution-box immune to the linear cryptanalysis. When an input mask value is not 16 as a result of the calculation of the linear distribution table (step 903) for any substitution-box (step 902), if it is determined that an absolute value of the multiplication of NS(a, b1) and NS(a, b2), 1NS(a, b1)NS(a, b2)1, is less than 48 for the case where a value of exclusive OR for a with the count of 1 only one and two output mask values, b1 and b2 is not the count of 1 (step 905), a substitution-box for which the L3 condition is satisfied is outputted (step 906).

Figure 10A:
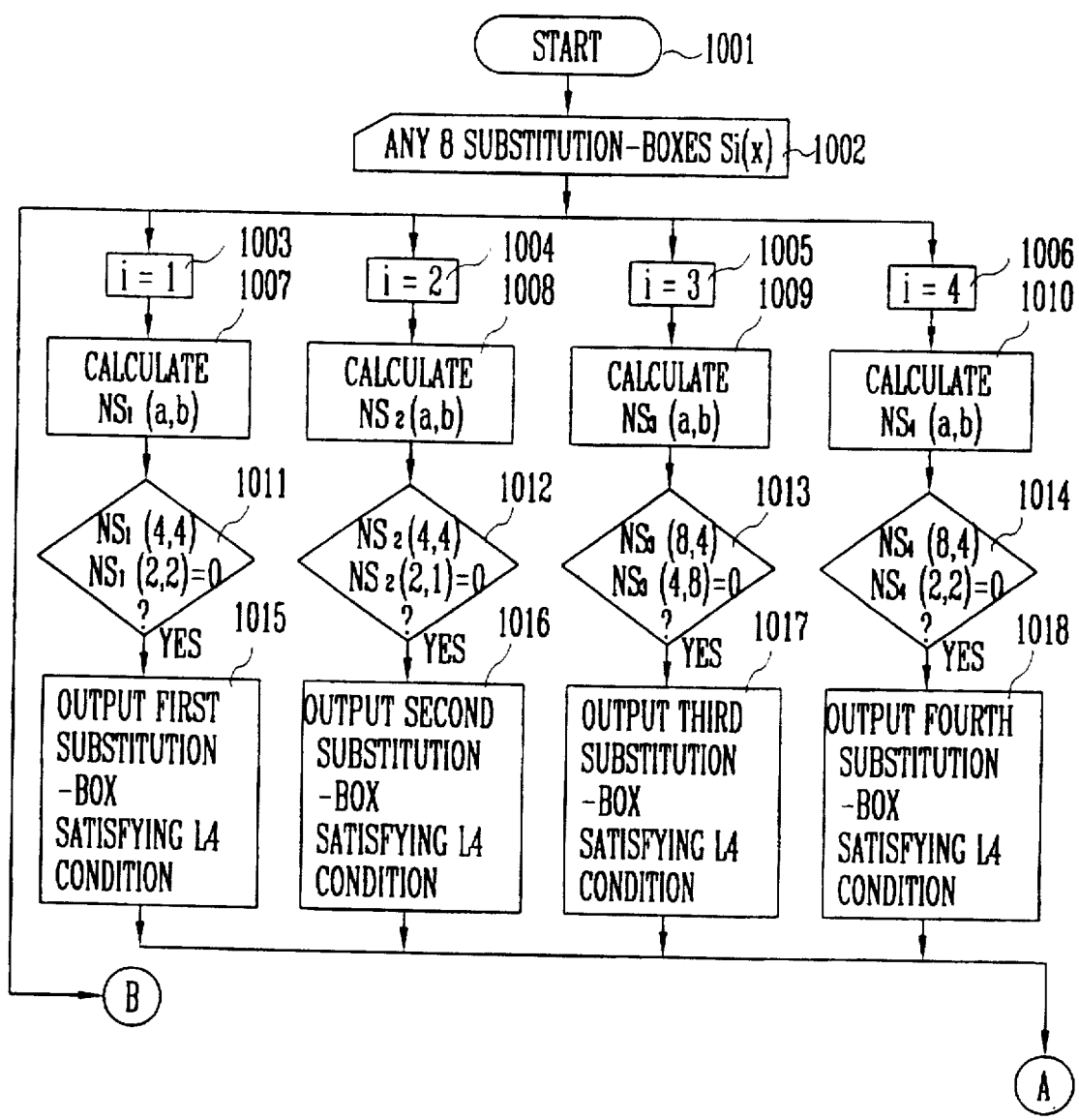
FIGS. 10A and 10B are flowcharts for illustrating an L4 condition check.
Figure 10B:
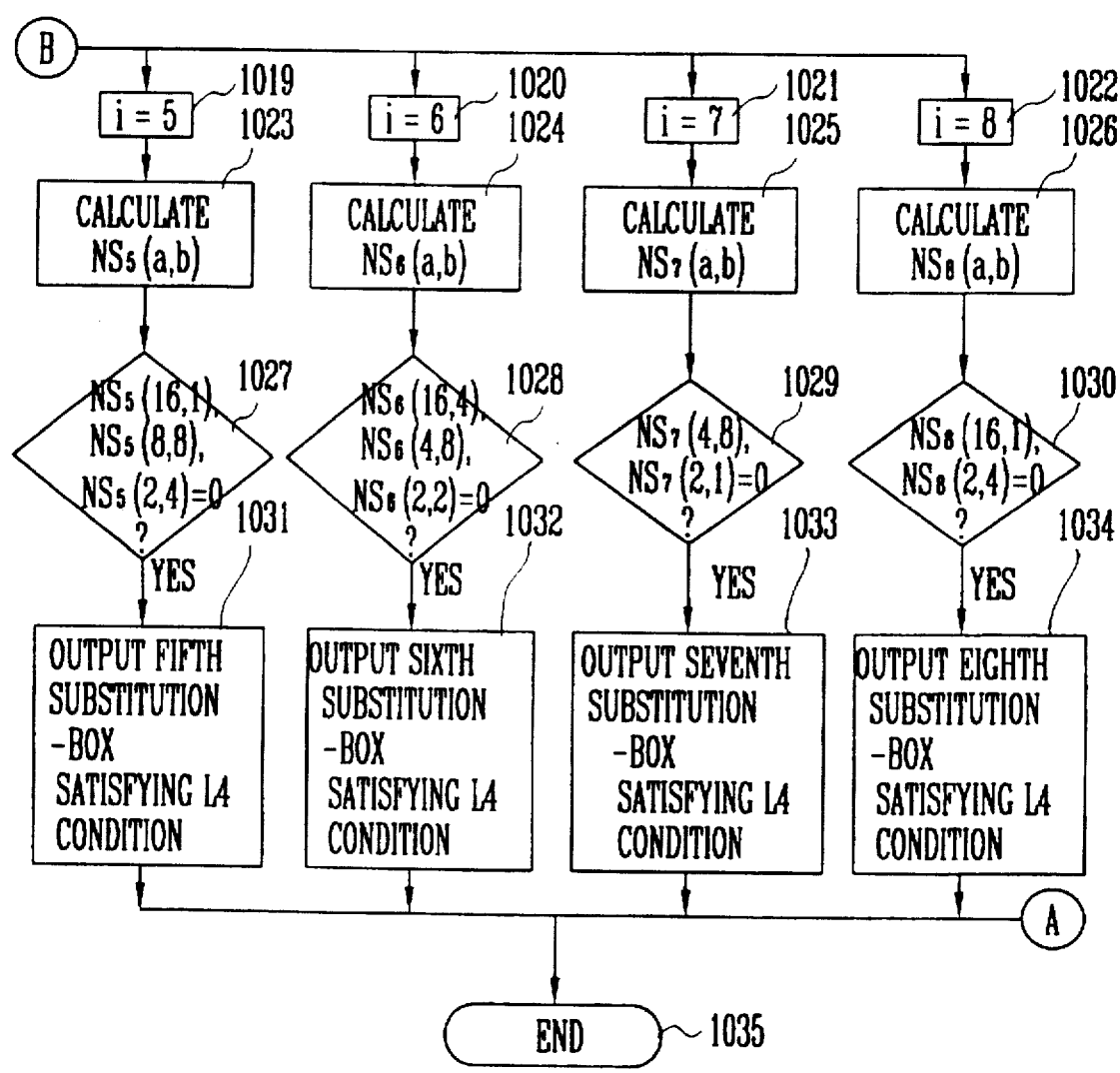

FIGS. 10A and 10B show flowcharts for checking an L4 condition as one of the conditions required to generate a secure substitution-box immune to the linear cryptanalysis.

In DES, 8 substitution-boxes is expected to play different roles every location to assure a security against the linear cryptanalysis. First of all, as a condition to assure a security against the linear cryptanalysis for each of 8 substitution-boxes, NS1(a, b) for any substitution box (step 1003) is calculated (step 1007), and if it is determined that values of NS1 (4, 4) and NS1 (2, 2) of the 8 substitution-boxes are 0(step 1011), a first substitution-box for which the L4 condition is satisfied is outputted (step 1015). NS2(a, b) for any substitution box (step 1004) is calculated (step 1008), and if it is determined that values of NS2(4, 4) and NS2(2, 1) of the 8 substitution-boxes are 0(step 1012), a second substitution-box for which the L4 condition is satisfied is outputted (step 1016).

NS3(a, b) for any substitution box (step 1005) is calculated (step 1009), and if it is determined that values of NS 3 (8, 4) and NS3 (4, 8) of the 8 substitution-boxes are 0(step 1013), a third substitution-box for which the L4 condition is satisfied is outputted (step 1017). NS4(a, b) for any substitution box (step 1006) is calculated (step 1010), and if it is determined that values of NS4(8, 4) and NS4(2, 2) of the 8 substitution-boxes are 0(step 1014), a fourth substitution-box for which the L4 condition is satisfied is outputted (step 1018). NS5(a, b) for any substitution box (step 1019) is calculated (step 1023), and if it is determined that values of NS5 (16, 1) and NS5 (8, 8) of the 8 substitution-boxes are 0(step 1027), a fifth substitution-box for which the L4 condition is satisfied is outputted (step 1031). NS6(a, b) for any substitution box (step 1020) is calculated (step 1024), and if it is determined that values of NS6(16, 4) and NS6(4, 8) of the 8 substitution-boxes are 0(step 1028), a sixth substitution-box for which the L4 condition is satisfied is outputted (step 1032). NS7(a, b) for any substitution box (step 1021) is calculated (step 1035), and if it is determined that values of NS7 (4, 8) and NS7 (2, 1) of the 8 substitution-boxes are 0(step 1029), a seventh substitution-box for which the L4 condition is satisfied is outputted (step 1033). NS8(a, b) for any substitution box (step 1022) is calculated (step 1026), and if it is determined that values of NS8(16, 1) and NS8(2, 4) of the 8 substitution-boxes are 0(step 1030), an eighth substitution-box for which the L4 condition is satisfied is outputted (step 1034).

Figure 11:
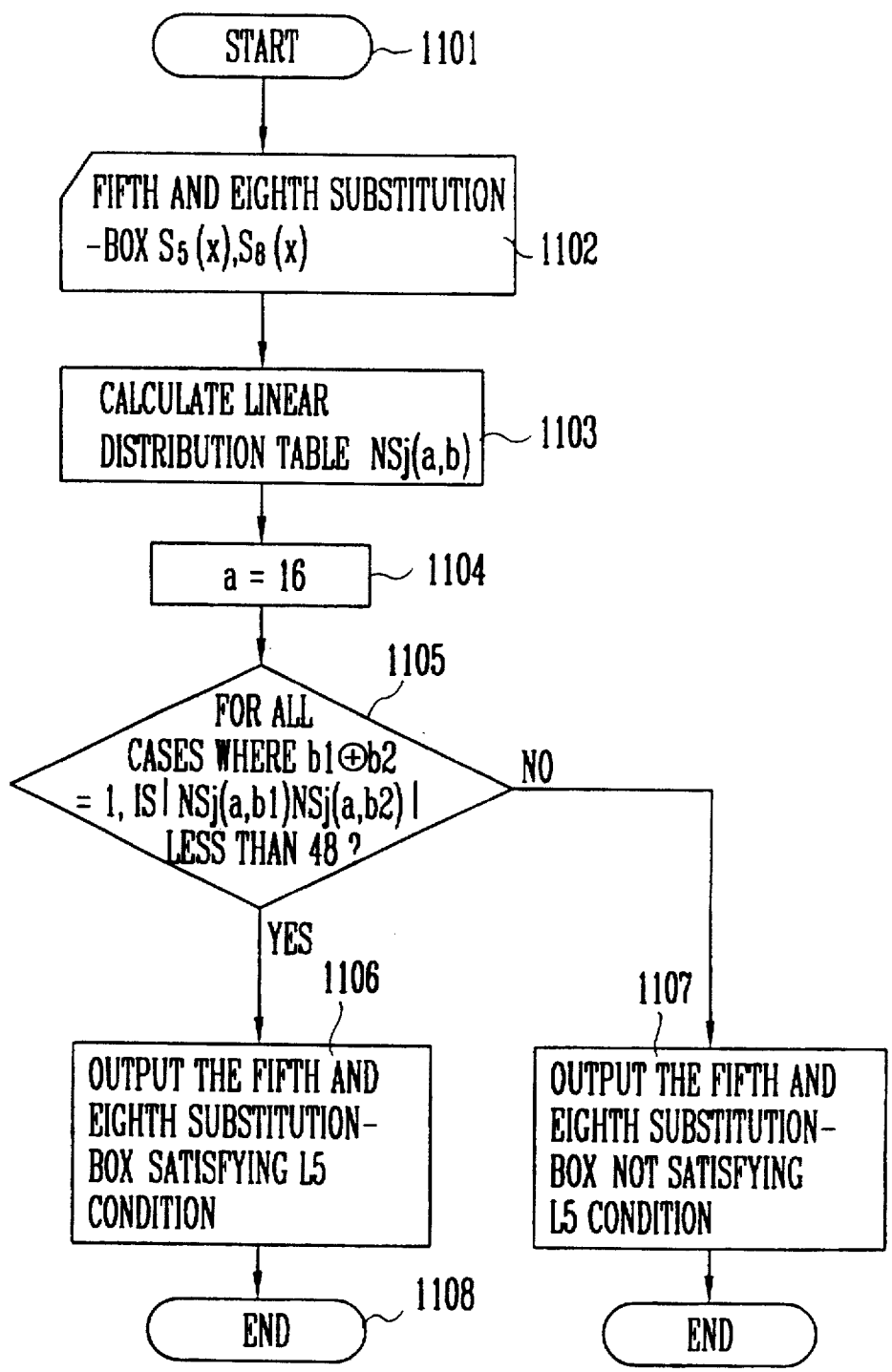
FIG. 11 is a flowchart for illustrating an L5 condition check.

FIG. 11 shows a flowchart for checking a special condition (L5) for generating the fifth substitution-box and the eighth substitution-box to minimize the linear repetition characteristics. In the case where the linear distribution tables NSj (a, b) of the fifth and eighth substitution-boxes are calculated (step 1103) and a value of exclusive OR of a with an input mask value of 16 (step 1104) and two output mask values b1 and b2 is 1, if it is determined that an absolute value of the multiplication of NSj (a, b1) and NSj(a, b2) is less than 48 (step 1105), the fifth and eighth substitution-boxes for which the L5 condition is satisfied is outputted (step 1106).

Figure 12:
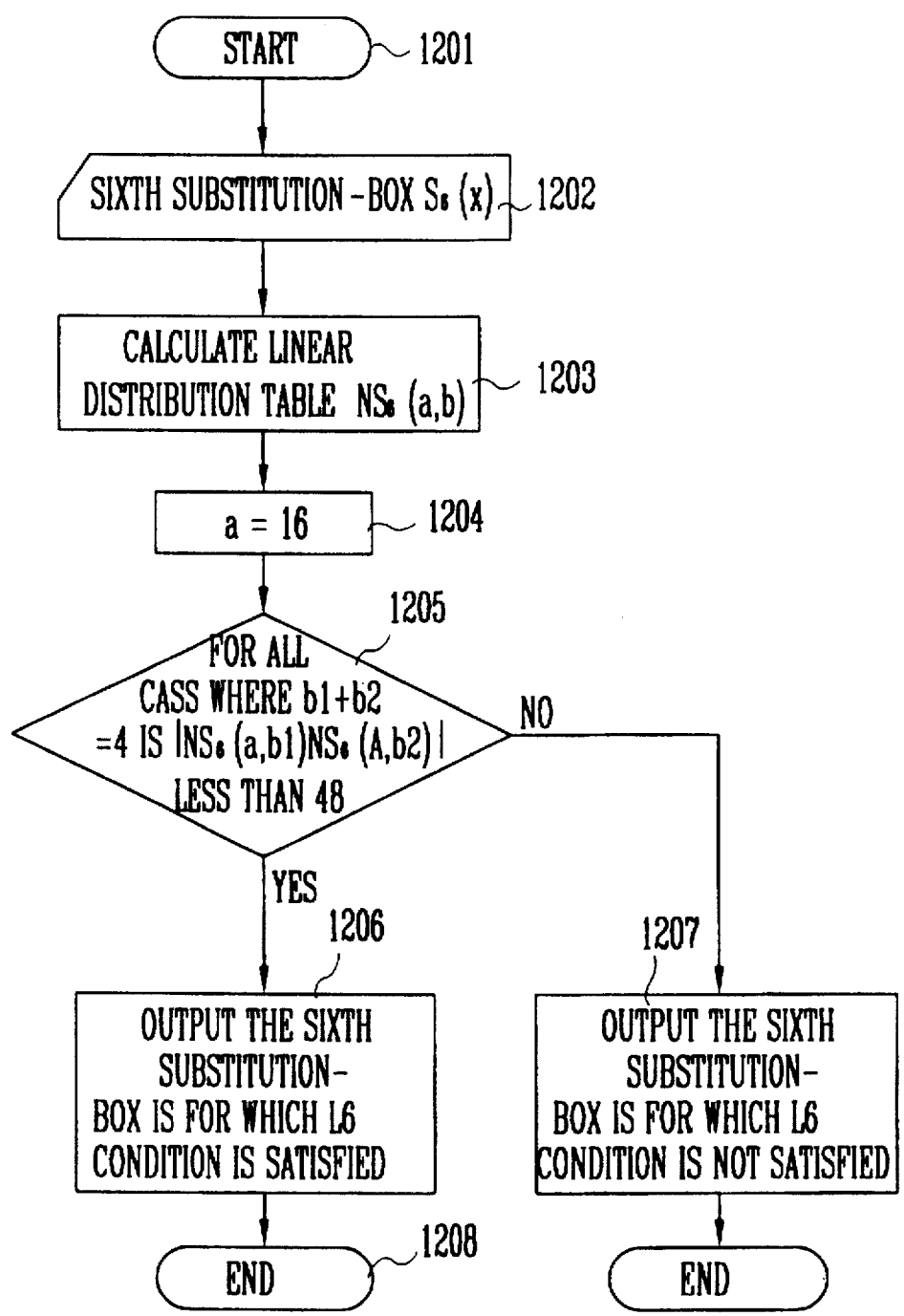
FIG. 12 is a flowchart for illustrating an L6 condition check.

FIG. 12 shows a flowchart for checking a special condition (L6) for generating the sixth substitution-box to minimize the linear repetition characteristics. In the case where the linear distribution table NS6(a, b) of the sixth substitution-box is calculated (step 1203) and a value of exclusive OR of a with an input mask value of 16 (step 1204) and two output mask values b1 and b2 is 4, if it is determined that an absolute value of the multiplication of NS6(a, b1) and NS6(a, b2) is less than 48 (step 1205), the sixth substitution-box for which the L6 condition is satisfied is outputted (step 1206).

Figure 13A:
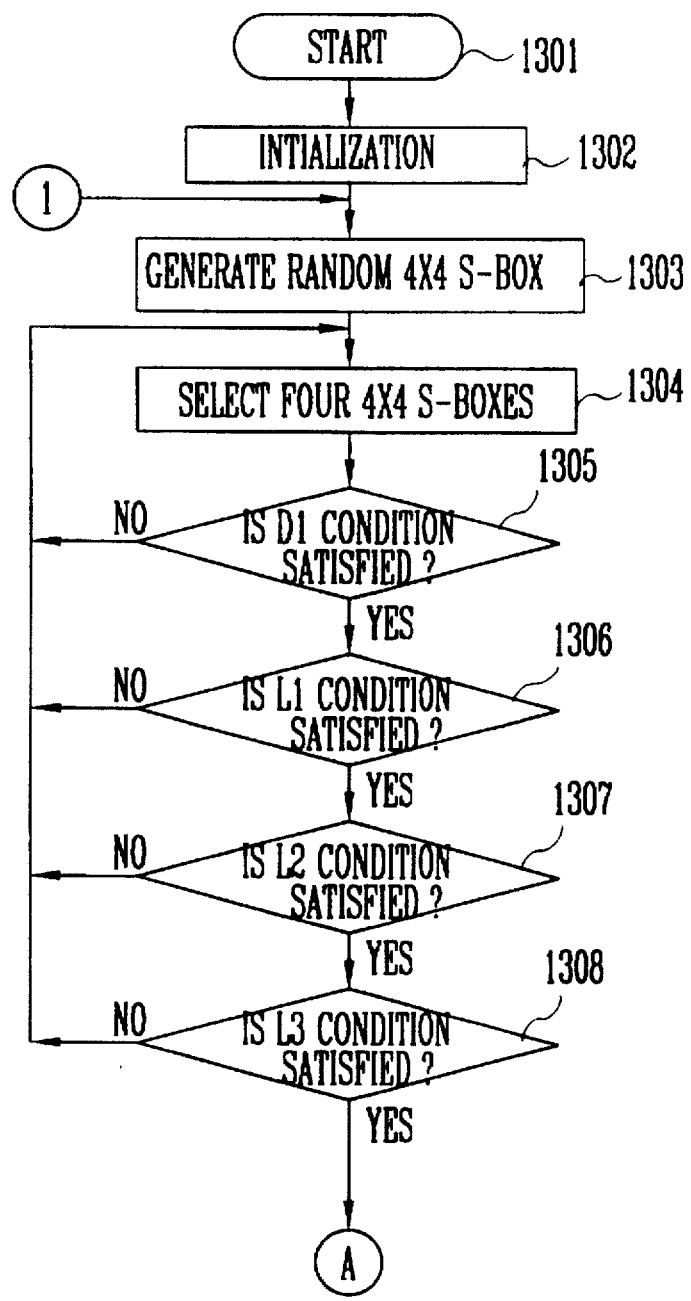
FIGS. 13A and 13B are flowcharts for illustrating the generation of 8 substitution-boxes according to the present invention.
Figure 13B:
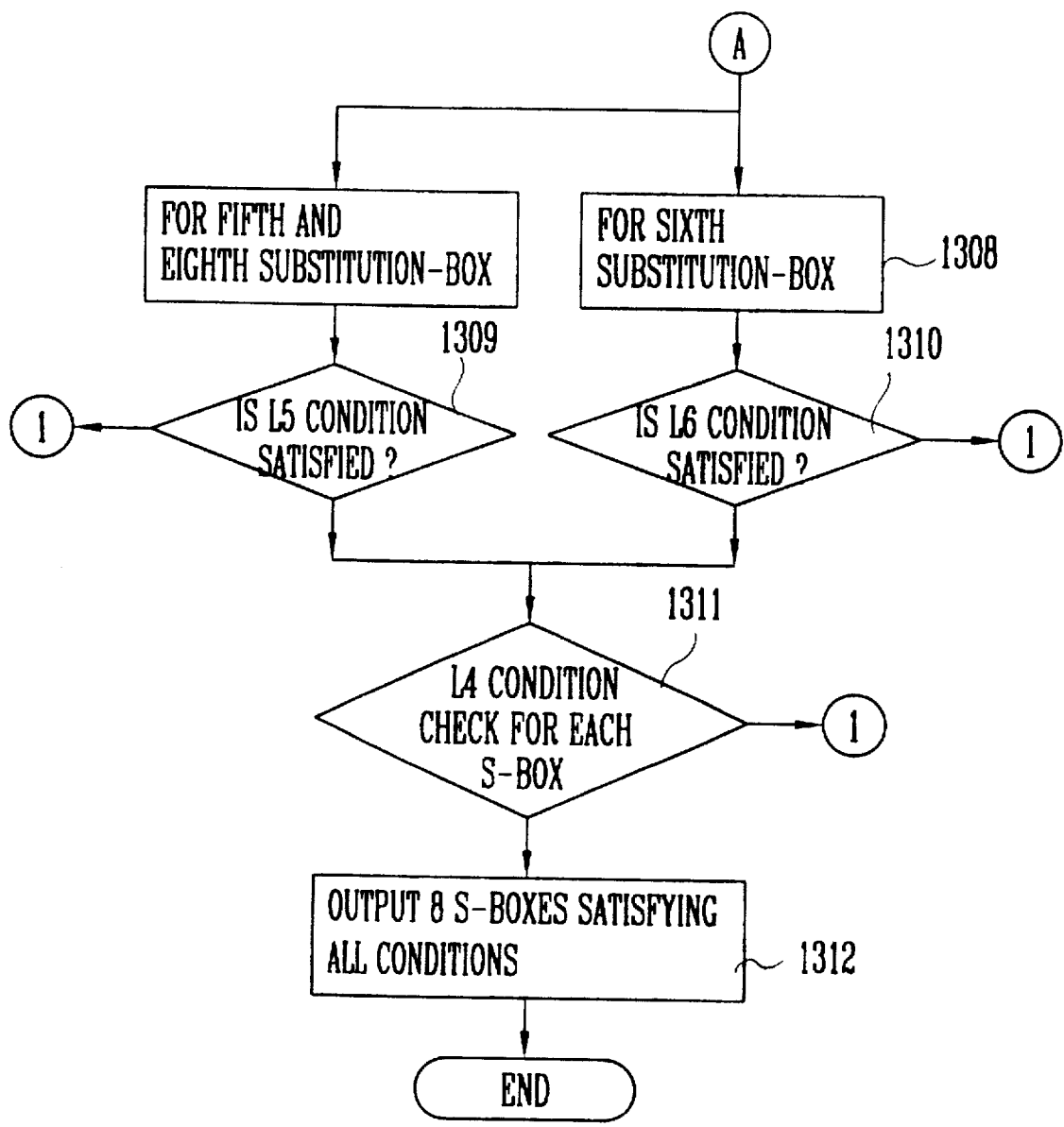

FIGS. 13A and 13B show flowcharts for illustrating the generation of 8 substitution-boxes according to the present invention. Referring to FIG. 13, after going through a initialization procedure (step 1302), random substitution is produced (step 1303) and then four substitutions are selected so that a sufficient number of a candidate substitution box is generated (step 1304).

For each of substitution-box, individual substitution-boxes for which the D1 condition (step 1305), the L1 condition (step 1306), the L2 condition (step 1307), and the L3 condition (step 1308) are satisfied are generated. Then, substitution-boxes for which the L5 condition (step 1309) and the L6 condition (step 1310) are satisfied is generated as candidates of the fifth, sixth, and eighth substitution-boxes. Finally, by checking the L4 condition (step 1311), each of 8 substitution-boxes is generated (step 1312).

FIGS. 14A to 14H show exemplary views of 8 substitution-boxes generated, according to the present invention. When the generated 8 substitution-boxes are used, the differential cryptanalysis and the linear cryptanalysis are not applicable to DES. Also, if substitution-boxes to be inserted are used in individualization, an individual security system is constructed so that a variety of the system is realized.

What is claimed is:

1. An apparatus for providing a secure substitution-box immune to differential and linear cryptanalysises comprising:

a preprocessor for exchanging a location by the unit of bit while passing the input of 64 bits data to be protected;

a parity checker for obtaining 56 bits key information by passing the input of the 64 bits key by byte unit;

a key expander for repetitive operation for generating 48 bits information upon receiving the key information;

at least sixteen operating portions for performing the 16 times of operation for one data from the preprocessor while mixing the data with an expanding key information from the key expander; and a postprocessor for generating an output signal of 64 bits data upon receiving an operated result from each of said 16 operating portions.

2. The apparatus as set forth in claim 1 further comprising:

an expander for receiving 32 bits input of the repetition operating portion and outputting an expanded 48 bits information;

an exclusive OR operator for performing an exclusive OR operation of the expanded key 48 bits from said key expander for repetitive operation and the 48 bits information from said expander by bit unit and then dividing the result into eight by the unit of 6 bits;

at least 8 substitution-boxes for obtaining 32 bits information by outputting each of the 6 bits resulted from the division by said exclusive OR operator as eight 4 bits, respectively and combining the eight 4 bits each other; and a location exchanger for exchanging the location of the 32 bits information from said at least 8 substitution-boxes to obtain an output signal of the repetition operation portion.

3. A method for providing a secure substitution-box, the method being applicable to an apparatus for generating the secure substitution-box immune to differential cryptanalysis, comprising:

a first step of checking whether the condition $S(x)$ is not equal to $S(x \oplus (11 \text{ efg0}))$ with respect to a value of any $S(x \oplus (11 \text{ efg0}))$ and all of 6 bits input for any substitution-box is satisfied or not; and a second step of, if it is determined that the condition is satisfied at the first step, selecting and providing a satisfied substitution-box, and if it is determined that the condition is not satisfied at the first step, selecting and providing a non-satisfied substitution-box.

4. A method for providing a secure substitution-box, the method being applicable to an apparatus for providing the secure substitution-box immune to linear cryptanalysis, comprising the steps of:

determining whether a corresponding condition of the apparatus for providing the secure substitution-box is immune to linear cryptanalysis; and providing a satisfied substitution-box.

5. The method as set forth in claim 4 further comprising the steps of:

a first step of reading out any substitution-box according to an established condition L1 and determining whether a maximum value is less than 16 or not by calculating a defined linear distribution table; and a second step of, if it is determinded that the maximum value is less than 16, providing a substitution-box for which said L1 condition is satisfied, and if it is determined that the maximum value exceeds 16, providing a substitution-box for which said L1 condition is not satisfied.

6. The method as set forth in claim 5 further comprising the steps of:

obtaining whether an absolute value on the linear distribution table is less than 10 or not for any a and b with the count of 1 less than two on the predefined linear distribution table of any substitution-box with one condition L2 to minimize a linear repetition characteristics; and providing a substitution-box for which the L2 condition is satisfied if it is determined that the absolute value is less than 10 and providing a substitution-box for which the L2 condition is not satisfied if it is determined that the absolute value exceeds 10.

7. The method as set forth in claim 5 further comprising the step of:

providing a substitution-box for which a preset L3 condition is satisfied if it is determined than an absolute value of the multiplication of NS(a, b1) and NS(a, b2) is less than 48 for the case where a value of exclusive OR for a with the count of 1 only one and two output mask values b1 and b2 is not count of 1 when an input mask value is not 16 as a result of the calculation of the predefined linear distribution table for any substitution-box for the condition L3.

8. The method as set forth in claim 5 further comprising the steps of:

calculating NS1(a, b) for any substitution box, as a condition to assure a security against the linear cryptanalysis for each of 8 substitution-boxes, and, if it is determined that values of NS1(4, 4) and NS1(2, 2) of the 8 substitution-boxes are 0, outputting a first substitution-box for which the L4 condition is satisfied;

calculating NS2(a, b) for any substitution box, and, if it is determined that values of NS2(4, 4) and NS2(2, 1) of the 8 substitution-boxes are 0, outputting a second substitution-box for which the L4 condition is satisfied;

calculating NS3(a, b) for any substitution box, and, if it is determined that values of NS3(8, 4) and NS3(4, 8) of the 8 substitution-boxes are 0, outputting a third substitution-box for which the L4 condition is satisfied;

calculating NS4(a, b) for any substitution box, and, if it is determined that values of NS4(8, 4) and NS4(2, 2) of the 8 substitution-boxes are 0, outputting a fourth substitution-box for which the L4 condition is satisfied;

calculating NS5(a, b) for any substitution box, and, if it is determined that values of NS5(16, 1) and NS5(8, 8) of the 8 substitution-boxes are 0, outputting a fifth substitution-box for which the L4 condition is satisfied;

calculating NS6(a, b) for any substitution box, and, if it is determined that values of NS6(16, 4) and NS6(4, 8) of the 8 substitution-boxes are 0, outputting a sixth substitution-box for which the L4 condition is satisfied;

calculating NS7(a, b) for any substitution box, and, if it is determined that values of NS7 (4, 8) and NS7 (2, 1) of the 8 substitution-boxes are 0, providing a seventh substitution-box for which the L4 condition is satisfied; and calculating NS8(a, b) for any substitution box, and, if it is determined that values of NS8(16, 1) and NS8(2, 4) of the 8 substitution-boxes are 0, providing an eighth substitution-box for which the L4 condition is satisfied.

9. The method as set forth in claim 5 further comprising the step of:

providing the fifth and eighth substitution-boxes for which an established condition L5 is satisfied if it is determined that an absolute value of the multiplication of NSj(a, b1) and NSj(a, b2) is less than 48 in the case where predefined linear distribution tables NSj(a, b) of the fifth and eighth substitution-boxes of the condition (L5) to minimize the linear repetition characteristics are calculated and a value of exclusive OR of a with an input mask value of 16 and two output mask values b1 and b2 is 1.

10. The method as set forth in claim 5 further comprising the step of:

providing a sixth substitution-box for which the L6 condition is satisfied if it is determined that an absolute value of the multiplication of NS6(a, b1) and NS6(a, b2) is less than 48 in the case where a defined linear distribution table NS6(a, b) of the sixth substitution-box of the condition (L6) for providing the sixth substitution-box to minimize the linear repetition characteristics is calculated and a value of exclusive OR of a with an input mask value of 16 and two output mask values b1 and b2 is 4.

11. The method as set forth in claim 5 further comprising the steps of:

after going through an initialization procedure, producing random substitution and then selecting four substitutions to identify a sufficient number of a candidate substitution-boxes;

for each of substitution-box providing individual substitution-boxes for which each established condition D1, L1, L2, L3 is satisfied; and providing substitution-boxes for which the L5 condition and the L6 condition are satisfied as candidates of the fifth, sixth, and eighth substitution-boxes and then providing each of 8 substitution-boxes by checking the L4 condition finally.

12. A method for generating a 6×4 S-box immune to both the differential cryptanalysis, and linear cryptanalysis comprising:

a first step of checking whether the condition that S (x) should not be equal to S(x⊕(11 efg0)) with respect to any efg value in $Z_2^3$ and all of 6 bits input for a given 6×4 S-box is satisfied or not; and a second step of, if a given S-box is satisfies the condition of the first step, reserving it as a candidate 6×4 S-box, otherwise, discarding the S-box.

13. The method as set forth in claim 12 further comprising:
   a first step of reading any 6×4 S-box and computing an absolute maximum value in a linear distribution table; and
   a second step of, if the absolute maximum value is less than or equal to 16, reserving it as a candidate 6×4 S-box satisfying L1 condition, and if the absolute maximum value exceeds 16, discarding the S-box.

14. The method as set forth in claim 12 further comprising:
   a first step of reading any 6×4 S-box and computing the linear distribution table; and
   a second step of, if an absolute value of an S-box linear distribution table, $|NS(a,b)|$ is less than or equal to 10 for all wt(a) and wt(b) less than or equal to 2, filtering a 6×4 S-box satisfying L2 condition, otherwise, discarding the S-box.

15. The method as set forth in claim 12 further comprising:
   when an input masked value is not 16 in the linear distribution table for an 6×4 S-box, determining whether an absolute value of the multiplication of $NS(a,b1)$ and $NS(a,b2)$ is less than or equal to 48 for all cases where wt(a) and $wt(b_1 \oplus b_2)$ are equal to 1, and, if so, then choosing this S-box as a candidate S-box for checking other conditions, otherwise, discarding the S-box.

16. The method as set forth in claim 12 further comprising the steps of:
   computing the linear distribution table, $NS_1(a,b)$, wherein the values of $NS_1(4,4)$ and $NS_1(2,2)$ are set to 0, and, if a 6×4 S-box satisfies this condition, choosing this S-box as a candidate to a first S-box satisfying L4 condition, otherwise discarding the S-box,
   computing a linear distribution table, $NS_2(a,b)$, wherein the values of $NS_2(4,4)$ and $NS_2(2,1)$ are set to 0, and, if a 6×4 S-box satisfies this condition, choosing this S-box as a candidate to a second S-box satisfying L4 condition, otherwise discarding the S-box,
   computing a linear distribution table, $NS_3(a,b)$, wherein the values of $NS_3(8,4)$ and $NS_3(4,8)$ are set to 0, and, if a 6×4 S-box satisfies this condition, choosing this S-box as a candidate to a third S-box satisfying L4 condition, otherwise, discarding the S-box,
   computing a linear distribution table, $NS_4(a,b)$, wherein the values of $NS_4(8,4)$ and $NS_4(2,2)$ are set to 0, and, if a 6×4 S-box satisfies this condition, choosing this S-box as a candidate to a fourth S-box satisfying L4 condition, otherwise, discarding the S-box,
   computing a linear distribution table, $NS_5(a,b)$, wherein the values of $NS_5(16,1)$ and $NS_5(8,8)$ and $NS_5(2,4)$ are set to 0, and, if a 6×4 S-box satisfies this condition, choosing this S-box as a candidate to a fifth S-box satisfying L4 condition, otherwise, discarding the S-box,
   computing a linear distribution table, $NS_6(a,b)$, wherein the values of $NS_6(16,4)$ and $NS_6(4,8)$ and $NS_6(2,2)$ are set to 0, and, if a 6×4 S-box satisfies this condition, choosing this S-box as a candidate to the sixth S-box satisfying L4 condition, otherwise, discarding the S-box,
   computing a linear distribution table, $NS_7(a,b)$, wherein the values of $NS_7(4,8)$ and $NS_7(2,1)$ are set to 0, and, if a 6×4 S-box satisfies this condition, choosing this S-box as a candidate to a seventh S-box satisfying L4 condition, otherwise, discarding the S-box,
   computing the linear distribution table, $NS_8(a,b)$, wherein the values of $NS_8(16,1)$ and $NS8(2,4)$ are set to 0, and, if a 6×4 S-box satisfies this condition, choosing this S-box as a candidate to an eighth S-box satisfying L4 condition, otherwise, discarding the S-box.

17. The method as set forth in claim 16 further comprising the step of:
   computing the linear distribution tables $NS_j(a,b)$ of the fifth and eighth S-boxes for j=5 and 8, when an input masked value is 16, an absolute value of the multiplication of $NS_j(a,b1)$ and $NS_j(a,b2)$ must be less than or equal to 48 for all cases where $b_1 \oplus b_2 = 1$, and when a 6×4 S-box satisfies this condition, choosing this S-box as a candidate to the fifth and eighth S-boxes satisfying L5 condition, otherwise discarding the S-box.

18. The method as set forth in claim 16 further comprising the step of:
   computing the linear distribution tables $NS_6(a,b)$ of the sixth S-box, when an input masked value is 16, an absolute value of the multiplication of $NS_6(a,b1)$ and $NS_6(a,b2)$ must be less than or equal to 48 for all cases where $b_1 \oplus b_2 = 4$, and when a 6×4 S-box satisfies this condition, choosing this S-box as a candidate to the sixth S-box satisfying L6 condition, otherwise discarding the S-box.

19. The method as set forth in claim 12 further comprising the steps of:
   generating a pool of random 4×4 S-boxes and selecting four 4×4 S-boxes as candidate 6×4 S-boxes for checking various conditions,
   determining if a randomly selected candidate 6×4 S-box satisfies a D1 condition, L1 condition, L2 condition, and L3 condition, and if the candidate S-box does not satisfy any one of these conditions, then returning to generate another random 6×4 S-box,
   determining, for a fifth and eighth S-boxes, whether the candidate S-box meets an L5 condition, and for a sixth S-box, whether the candidate S-box satisfies an L6 condition, and if the L5 and L6 conditions are not satisfied, then generating a random candidate S-box,
   checking an L4 condition for each 6×4 S-box, and generating a set of 8 6×4 S-boxes.

20. The method of claim 19, further comprising the step of using an exemplary set of 8 6×4 S-boxes.

* * * * *